United States Patent
Pendar et al.

(10) Patent No.: US 12,430,678 B2
(45) Date of Patent: Sep. 30, 2025

(54) SOLVING SPARSE DATA PROBLEMS IN A RECOMMENDATION SYSTEM WITH FREEZING START

(71) Applicant: SAP SE, Walldorf (DE)

(72) Inventors: Nick Pendar, San Ramon, CA (US); Seyed Farhad Faghihi, Vancouver (CA)

(73) Assignee: SAP SE, Walldorf (DE)

( * ) Notice: Subject to any disclaimer, the term of this patent is extended or adjusted under 35 U.S.C. 154(b) by 147 days.

(21) Appl. No.: 18/083,373

(22) Filed: Dec. 16, 2022

(65) Prior Publication Data
US 2024/0202798 A1    Jun. 20, 2024

(51) Int. Cl.
| | |
|---|---|
| *G06Q 30/00* | (2023.01) |
| *G06Q 30/0202* | (2023.01) |
| *G06Q 30/0601* | (2023.01) |

(52) U.S. Cl.
CPC ..... *G06Q 30/0631* (2013.01); *G06Q 30/0202* (2013.01)

(58) Field of Classification Search
CPC ........... G06Q 30/0601; G06Q 30/0613; G06Q 30/0623; G06Q 30/0629; G06Q 30/0631
See application file for complete search history.

(56) References Cited

U.S. PATENT DOCUMENTS

| | | | | |
|---|---|---|---|---|
| 7,987,188 B2* | 7/2011 | Neylon | ................ | G06F 16/313 |
| | | | | 706/45 |
| 8,386,336 B1* | 2/2013 | Fox | .................... | G06Q 30/0631 |
| | | | | 705/26.7 |
| 8,417,713 B1* | 4/2013 | Blair-Goldensohn | ...................... | |
| | | | | G06F 16/9535 |
| | | | | 705/347 |
| 9,058,765 B1 | 6/2015 | Mallick et al. | | |
| 9,075,861 B2 | 7/2015 | Aravamudan et al. | | |
| 9,524,518 B1* | 12/2016 | Singer | ................ | G06Q 30/0603 |
| 9,734,634 B1* | 8/2017 | Mott | ....................... | G06F 3/002 |
| 11,321,580 B1 | 5/2022 | Walczak et al. | | |
| 11,769,193 B2 | 9/2023 | Klein et al. | | |
| 2001/0021914 A1* | 9/2001 | Jacobi | .................... | G06Q 30/02 |
| | | | | 705/26.1 |
| 2005/0162670 A1* | 7/2005 | Shuler | ................ | H04N 1/00408 |
| | | | | 358/1.2 |
| 2005/0256778 A1 | 11/2005 | Boyd et al. | | |
| 2007/0043338 A1* | 2/2007 | Moll | ...................... | A61B 34/30 |
| | | | | 606/1 |
| 2007/0046675 A1* | 3/2007 | Iguchi | ................... | G06T 11/206 |
| | | | | 345/441 |
| 2007/0197896 A1* | 8/2007 | Moll | ...................... | A61B 34/20 |
| | | | | 600/407 |

(Continued)

OTHER PUBLICATIONS

Jafri, Syed Irteza Hussain, et al. "Deep transfer learning with multimodal embedding to tackle cold-start and sparsity issues in recommendation system." Plos one 17.8 (2022) (Year: 2022).*

(Continued)

*Primary Examiner* — Christopher B Seibert
(74) *Attorney, Agent, or Firm* — Klarquist Sparkman, LLP

(57) ABSTRACT

Recommendation services typically struggle with sparse data scenarios. A freezing generated item start technique can use a matrix of external generated items to find a linking generated item. Embeddings can be used to determine distance between items. The technologies are useful for providing recommendations even in scenarios involving little or no transaction data.

15 Claims, 10 Drawing Sheets

(56) References Cited

U.S. PATENT DOCUMENTS

| | | | |
|---|---|---|---|
| 2009/0069229 A1* | 3/2009 | Smith | A61P 31/14 435/7.1 |
| 2009/0110089 A1* | 4/2009 | Green | H04L 5/0037 370/329 |
| 2009/0125371 A1* | 5/2009 | Neylon | G06F 16/313 707/739 |
| 2010/0268661 A1* | 10/2010 | Levy | G06Q 30/02 705/347 |
| 2011/0093249 A1* | 4/2011 | Holmes | G16H 50/20 703/6 |
| 2011/0153362 A1 | 6/2011 | Valin et al. | |
| 2011/0238083 A1* | 9/2011 | Moll | A61B 8/12 606/130 |
| 2012/0321759 A1* | 12/2012 | Marinkovich | A61B 5/442 356/402 |
| 2013/0091034 A1 | 4/2013 | Gudmundsson | |
| 2013/0215116 A1 | 8/2013 | Siddique et al. | |
| 2013/0325558 A1* | 12/2013 | Rosenberg | G06Q 30/0206 705/7.35 |
| 2014/0081701 A1* | 3/2014 | Lakshminarayanan | G06Q 30/02 705/7.29 |
| 2014/0195931 A1* | 7/2014 | Kwon | G06Q 30/02 715/753 |
| 2014/0201126 A1 | 7/2014 | Zadeh et al. | |
| 2014/0289167 A1* | 9/2014 | Rosenberg | G06Q 30/0283 705/400 |
| 2014/0351079 A1* | 11/2014 | Dong | G06Q 30/0282 705/26.7 |
| 2015/0242949 A1 | 8/2015 | Phillips | |
| 2015/0290795 A1* | 10/2015 | Oleynik | B25J 9/0081 700/257 |
| 2015/0379732 A1* | 12/2015 | Sayre, III | G06T 11/001 382/164 |
| 2016/0059412 A1* | 3/2016 | Oleynik | G05B 19/42 700/250 |
| 2016/0127710 A1* | 5/2016 | Saban | G11B 27/005 386/241 |
| 2016/0162975 A1 | 6/2016 | Chen et al. | |
| 2016/0210602 A1* | 7/2016 | Siddique | G16H 10/60 |
| 2017/0171580 A1* | 6/2017 | Hirsch | H04L 67/62 |
| 2017/0193997 A1* | 7/2017 | Chen | G10L 15/26 |
| 2017/0323368 A1* | 11/2017 | Eastman | G06F 16/9537 |
| 2018/0047208 A1 | 2/2018 | Marin et al. | |
| 2018/0204111 A1 | 7/2018 | Zadeh et al. | |
| 2018/0217990 A1* | 8/2018 | Kumar | G06F 16/9535 |
| 2018/0218063 A1* | 8/2018 | Nag | H04L 67/306 |
| 2018/0218082 A1* | 8/2018 | Mitra | G06F 16/958 |
| 2018/0218087 A1* | 8/2018 | Rapaka | G06F 16/2457 |
| 2018/0276869 A1 | 9/2018 | Matts et al. | |
| 2018/0276883 A1 | 9/2018 | D'Alessandro et al. | |
| 2019/0098039 A1* | 3/2019 | Gates | G16H 20/70 |
| 2019/0099124 A1* | 4/2019 | Mattis | A61B 5/0205 |
| 2019/0295124 A1* | 9/2019 | Ramesh | G06N 3/084 |
| 2019/0304000 A1* | 10/2019 | Simpson | G16B 40/00 |
| 2020/0184278 A1 | 6/2020 | Zadeh et al. | |
| 2020/0302337 A1 | 9/2020 | Jeffery et al. | |
| 2020/0394211 A1 | 12/2020 | Pendar | |
| 2021/0055973 A1 | 2/2021 | Pendar et al. | |
| 2021/0109961 A1 | 4/2021 | Pendar | |
| 2021/0110457 A1* | 4/2021 | Polanía Cabrera | G06V 20/00 |
| 2021/0342701 A1 | 11/2021 | Ayush et al. | |
| 2021/0366023 A1* | 11/2021 | Maldonado | G06Q 30/0631 |
| 2022/0058714 A1* | 2/2022 | Chen | G06N 3/084 |
| 2022/0084296 A1* | 3/2022 | Sadalgi | G06T 19/006 |
| 2022/0121884 A1 | 4/2022 | Zadeh et al. | |
| 2022/0179895 A1 | 6/2022 | Pendar | |
| 2022/0198388 A1* | 6/2022 | Simpson | G01C 21/3807 |
| 2022/0198562 A1 | 6/2022 | Cella et al. | |
| 2022/0215471 A1 | 7/2022 | Simpson | |
| 2022/0230189 A1 | 7/2022 | Jeffery et al. | |
| 2022/0245574 A1 | 8/2022 | Cella et al. | |
| 2022/0245702 A1* | 8/2022 | Sundaresan | G06N 7/01 |
| 2022/0300828 A1 | 9/2022 | Daly et al. | |
| 2024/0202797 A1 | 6/2024 | Pendar et al. | |

OTHER PUBLICATIONS

Bell, Robert M., and Yehuda Koren. "Improved neighborhood-based collaborative filtering." KDD cup and workshop at the 13th ACM SIGKDD international conference on knowledge discovery and data mining. sn, 2007. (Year: 2007).*

"Approximate Nearest Neighbors Oh Yeah (ANNOY)," AAU Social Data Science Deep Learning, 2019 Portfolio, Aalborg University, sds-aau.github.io, visited Nov. 16, 2022, 7 pages.

"Nearest Neighbor Search," *Wikipedia*, en.wikipedia.org, Nov. 3, 2022, 9 pages.

Hwang, "A Fast Nearest Neighbor Search Algorithm by Nonlinear Embedding," *2012 IEEE Computer Society Conference on Computer Vision and Pattern Recognition*, 2012, pp. 3053-3060, 8 pages.

Trabelsi, "Comprehensive Guide to Approximate Nearest Neighbors Algorithms," *Towards Data Science*, towardsdatascience.com, Feb. 14, 2020, 31 pages.

"Word2vec," *Wikipedia*, en.wikipedia.org, Nov. 19, 2022, 8 pages.

"Hierarchical Navigable Small Worlds (HNSW): Vector Search," *Faiss: The Missing Manual*, Pinecone, pinecone.io, visited Dec. 2, 2022, 26 pages.

Zhu et al., "Learning to warm up cold item embeddings for cold-start recommendation with meta scaling and shifting networks," Proceedings of the 44th International ACM SIGIR Conference on Research and Development in Information Retrieval, 2021.

Wei et al., "Contrastive Learning for Cold-Start Recommendation," MM -21, Oct. 20-24, 2021, Virtual Event, China, pp. 5382-5390.

* cited by examiner

|    | P1  | P2 | P3 | P6  | P7 |
|----|-----|----|----|-----|----|
| P2 | .41 |    | .5 | .08 |    |

|    | P1  | P2 | P3 | P6  | P7 |
|----|-----|----|----|-----|----|
| P3 | .41 |    | .5 | .08 |    |

|    | P1  | P2  | P3  | P4  | P6  | P7  |
|----|-----|-----|-----|-----|-----|-----|
| P1 |     | .5  | .41 | .4  |     |     |
| P2 | .41 |     |     | .5  | .08 |     |
| P3 | .41 |     |     | .5  | .08 |     |
| P4 | .28 | .42 | .5  |     |     | .28 |
| P6 |     | .11 | .08 |     |     | .77 |
| P7 |     |     |     | .36 | .63 |     |

600

| | P2 | P3 | P4 | P5 | P6 | P7 |
|---|---|---|---|---|---|---|
| P1 | | .5 | .41 | .4 | | |

| | P1 | P2 | P3 | P4 | P6 | P7 |
|---|---|---|---|---|---|---|
| P5 | | .5 | .41 | .4 | | |

| | P1 | P2 | P3 | P4 | P5 | P7 |
|---|---|---|---|---|---|---|
| P6 | | .11 | .8 | | | .77 |

| | P1 | P2 | P3 | P4 | P5 | P7 |
|---|---|---|---|---|---|---|
| P8 | | .11 | .8 | | | .77 |

| | P1 | P2 | P3 | P4 | P5 | P6 | P7 | P8 |
|---|---|---|---|---|---|---|---|---|
| P1 | | .5 | .41 | .4 | | | | |
| P2 | .41 | | | .5 | .5 | .08 | | .11 |
| P3 | .41 | | | .5 | .41 | .08 | | .8 |
| P4 | .28 | .42 | .5 | | .4 | | .28 | |
| P5 | | .5 | .41 | .4 | | | | |
| P6 | | .11 | .8 | | | | .77 | |
| P7 | | | | .36 | | .63 | | .77 |
| P8 | | .11 | .8 | | | | .77 | |

700

FIG. 7

SOLVING SPARSE DATA PROBLEMS IN A RECOMMENDATION SYSTEM WITH FREEZING START

FIELD

The field generally relates to sparse data scenarios for recommendation systems.

BACKGROUND

Recommendation systems are a recognized technology that has been applied in a variety of domains. However, a typical recommendation system only functions well if it has sufficient historical transaction data. In cases where such data is sparse, recommendation systems do not function well or do not function at all.

There therefore remains a need for better solutions for providing recommendations in sparse data scenarios.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises building a generated-item-by-generated-item matrix representing correlations between external generated items based on observed transactions for the external generated items; embedding representations of the external generated items into a warm embedded vector space; for a plurality of freezing generated items, embedding representations of the plurality of freezing embedded items into a freezing embedded vector space; for a freezing generated item out of the freezing generated items, determining a location of the freezing generated item in the warm embedded vector space; finding a nearest neighbor external generated item r of the freezing generated item within a complementary threshold distance of the freezing generated item in the warm embedded vector space; for a given linking external generated item out of a plurality of possible linking external generated items appearing in the matrix for r, determining whether a linked freezing nearest neighbor generated item exists for the given linking external generated item in the freezing embedded vector space; responsive to determining that a linked freezing nearest neighbor generated item exists, associating the freezing generated item with the linked freezing nearest neighbor generated item for recommendation; and outputting a recommendation based on the association.

In another embodiment, a computing system comprises a generated-item-by-generated-item matrix stored in one or more non-transitory computer-readable media and representing observed co-occurrences within transactions of external generated items represented in the matrix; an internal representation of a high-dimensional embedded vector space in which a freezing generated item is represented along with a plurality of warm generated items out of the external generated items; and a recommendation extension service configured to identify a warm approximate nearest neighbor of the freezing generated item in the high-dimensional embedded vector space, search candidate linking items found in matrix entries of the warm approximate nearest neighbor for linked freezing items within a threshold distance of the candidate linking items in the high-dimensional embedded vector space, and responsive to finding a linked freezing generated item, associating the freezing generated item with the linked freezing generated item.

In another embodiment, one or more non-transitory computer-readable media have stored therein computer-executable instructions that when executed by a computing system, cause the computing system to perform a method of outputting a generated item recommendation from a plurality of possible generated items, the method comprising building a generated-item-by-generated-item matrix representing correlations between external generated items based on observed transactions for the external generated items; pruning the generated-item-by-generated-item matrix; normalizing the generated-item-by-generated-item matrix; embedding representations of the external generated items into a warm embedded high-dimensional vector space based on titles of the external generated items; for a plurality of freezing generated items, embedding the plurality of freezing generated items into a freezing embedded high-dimensional vector space based on titles of the freezing generated items; for a freezing generated item out of the freezing generated items, determining a location of the freezing generated item in the warm embedded high-dimensional vector space;

finding a nearest neighbor external generated item r of the freezing generated item within a complementary threshold distance of the freezing generated item in the warm embedded high-dimensional vector space; for a given linking generated item out of a plurality of possible linking generated items appearing in rows and columns for r within the matrix, determining whether a linked freezing nearest neighbor generated item exists for the given linking generated item in the freezing embedded high-dimensional vector space; and responsive to determining that a linked freezing nearest neighbor generated item exists, associating the freezing generated item with the linked freezing nearest neighbor generated item for recommendation.

As described herein, a variety of features and advantages can be incorporated into the technologies as desired.

BRIEF DESCRIPTION OF THE DRAWINGS

FIGS. 6 and 7 are block diagrams of a substitution scenario for a matrix M.

DETAILED DESCRIPTION

Example 1—Overview

Recommendation technologies can be helpful in a variety of situations, including online shopping portals, targeted offers, and the like. Although there are automated technologies for recommending generated items given historical data, such technologies struggle when faced with sparse data scenarios. In practice, sparse data scenarios can arise in a variety of circumstances. For example, a new generated item can be introduced as part of a new product cycle; a new vendor may start a new portal; a new vendor may be added to an existing portal; or the like.

In one implementation, a matrix represents co-occurrence data of observed transactions involving the generated items. In sparse data scenarios, there may be little or no data in the matrix for a generated item, so such an item may have no recommendations and, conversely, may not be recommended. Instead, as described herein, both cold and freezing generated item scenarios can be addressed.

In a cold generated item scenario, a nearest neighbor search technique can be used to identify a nearest warm generated item in an embedded vector space. Upon finding a suitable match, the match can be used as a proxy for the cold generated item. For example, matrix information for the warm generated item can be used in the matrix for the cold generated item.

In a freezing generated item scenario, a matrix representing warm items from external transactions can be used to link freezing items together. For example, a nearest neighbor to a first freezing item in the warm items can be linked to another warm item in the matrix, and a nearest freezing neighbor to the other warm item can be used to find a generated item suitable for recommendation for the first freezing item.

Various pruning and normalization techniques can be implemented as described herein. Further, categories of generated items can be used as a filter when using nearest neighbor search techniques.

The techniques described herein can be used to make effective recommendations even when little or no data is involved.

Due to the sheer complexity of computing nearest neighbor in high scale scenarios, an approximate nearest neighbor search technique can be used to improve performance.

Other benefits are possible as described herein.

The described technologies thus offer considerable improvements over conventional techniques.

Figure 1:
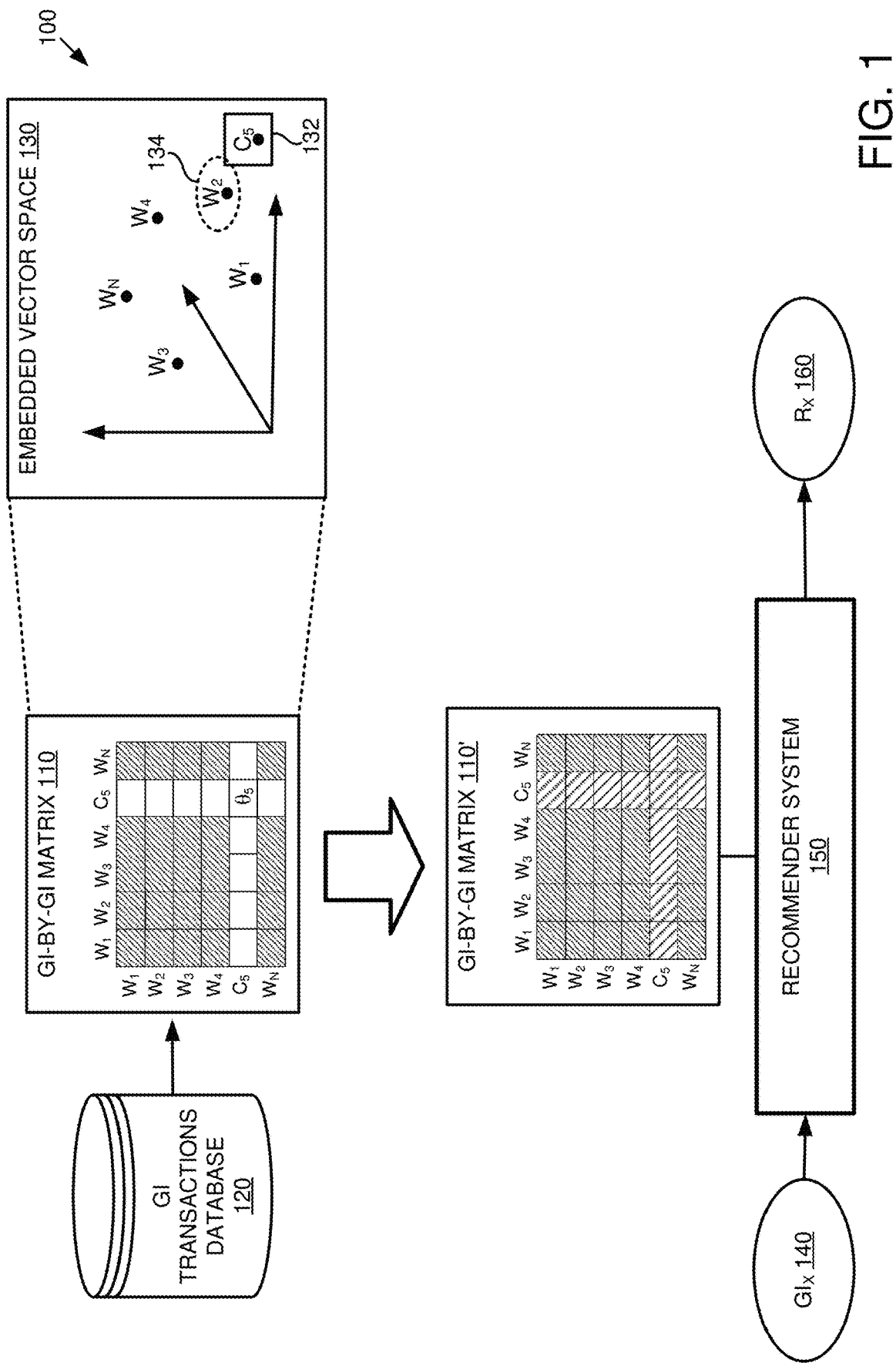
FIG. 1 is a block diagram of an example system implementing recommendations in a sparse data scenario with cold generated items.

Example 2—Example System Implementing Recommendations in a Sparse Data Scenario with Cold Generated Items FIG. 1 is a block diagram of an example system 100 implementing recommendations in a sparse data scenario with cold generated items. In the example, a generated items transactions database 120 stores historical data indicating when generated items were observed to be part of the same transaction (e.g., co-occurrence data). The generated-item-by-generated-item matrix 110 represents the transactions in the database 120 and an n×n format. An entry (e.g., $M_{a,b}$) indicates the co-occurrence of generated items in transactions (e.g., how many times generated item a and generated item b appeared in a same transaction). In practice, the matrix 110 can be symmetrical about the diagonal. By convention, values stored in the diagonal can be used to indicate the number of transactions observed for a given generated item (e.g., $\theta_c$ indicates the number of times generated item c was observed to co-occur with other items). Pruning and normalization can be used for the matrix 110 as described herein. The matrix 110 comprises at least one sparse data scenario for a generated item represented in the matrix. In the example, the rows and columns $W_{1-4}$ and $W_N$ have been determined to be warm, and the row and column $C_5$ has been determined to be cold. In practice, the number of transactions (e.g., $\theta_x$) can be used as a threshold to determine whether an item is deemed to be cold.

A representation of an embedded vector space 130 can be stored as representations of generated items in the matrix 110 that are embedded into the space based on attributes of the items as described herein. The embedded vector space 130 can be a high-dimensional vector space that represents attributes of the respective items as described herein.

As described herein, when a warm item (e.g., $W_2$) 134 is found to be a nearest neighbor (e.g., within a threshold) to a cold item ($C_5$) 132 in the embedded vector space represented in the space 130, the values (e.g., row and column) in the matrix 110 for the nearest neighbor $W_2$ can be copied to the matrix, resulting in an updated matrix 110' that contains usable values for the cold item. A category tree can be included, and category filtering can be used as described herein.

Subsequently, when a request 140 comes in for a recommendation for a generated item, a recommender system 150 can consult the updated matrix 110' and generate a recommendation 160 based on the matrix. For example, the recommender system can find one or more greatest values in the matrix 110' for the item in the request 140 and output the respective one or more items associated in the matrix 110' with such values as the recommendation 160. In practice, the subject of the request 140 or the recommendation 160 can comprise a cold item cold for which warm values were copied into the matrix 110'.

The technologies thus provide recommendations for cold items for which there would otherwise be no recommendations. And, cold items can be provided as a recommendation for other items.

Further components can be provided. For example, a freezing start can be combined with the cold start scenario.

In practice, the systems shown herein, such as system 100, can vary in complexity, with additional functionality, more complex components, and the like. For example, in practice, the number of generated items can approach and exceed thousands, tens of thousands, or millions. Additional components can be included to implement security, redundancy, load balancing, report design, and the like.

Although some computing systems use a singular form (e.g., client computer, server computer, or the like), in practice, such computing systems can comprise plural computers (e.g., a server farm, data center, or the like).

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the database 120, matrices 110 and 110', embedded vector space 130, generated item recommendation 160, and the like can be stored (e.g., persisted) in one or more computer-readable storage media or computer-readable storage devices. The technologies described herein can be generic to the specifics of operating systems or hardware and can be applied in any variety of environments to take advantage of the described features.

Figure 2:
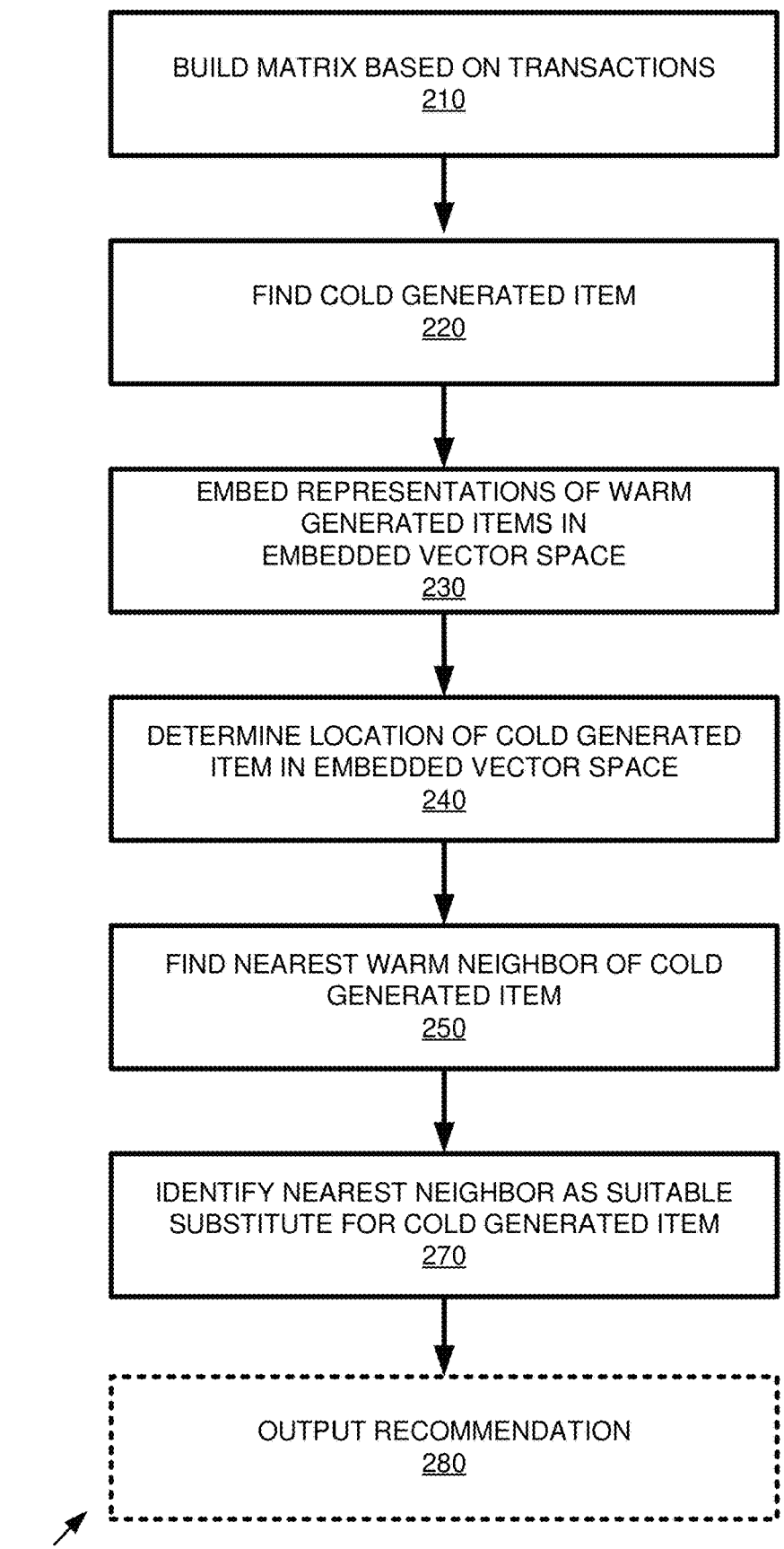
FIG. 2 is a flowchart of an example method of providing recommendations in a sparse data scenario with cold generated items.

Example 3—Example Method of Providing Recommendations in a Sparse Data Scenario with Cold Generated Items FIG. 2 is a flowchart of an example method 200 implementing recommendations in a sparse data scenario with cold generated items and can be performed, for example, by the system of FIG. 1. The method 200 outputs a generated item recommendation from a plurality of generated items in an offered catalog.

At 210, a generated-item-by-generated-item matrix is built based on observed transactions involving the generated items. For example, a database of transactions involving the generated items can be mined to determine co-occurrences of the items in transactions. The matrix thus represents correlations between the plurality of generated items based on observed transactions for the generated items. As described herein, the matrix can comprise at least one sparse data scenario for a generated item represented in the matrix. For example, at least one generated item can be cold, at least one generated item can be freezing, or both.

As described herein, the matrix can be pruned, normalized, or both.

At 220, a cold generated item in the generated-item-by-generated-item matrix is found. For example, the matrix can be examined to find those items having less than a threshold number of observed co-occurrence transactions, which are determined to be cold; the remaining items can be determined to be warm. Cold items can be processed seriatim, in parallel, or the like.

At 230, representations of warm items appearing in the matrix are embedded into the embedded vector space. In the example, such warm items are at least a subset of the plurality of generated items. Scenarios involving a freezing start may have no warm items. The items are embedded into the embedded vector space based on attributes of the items as described herein.

At 240, a location of the cold generated item in the same embedded vector space is determined based on attributes of the cold generated item. The various approaches described herein can be used for embedding.

At 250, a nearest warm neighbor of the cold generated item in the embedded vector space is found using a nearest neighbor search technique. A threshold can be used to filter out neighbors beyond a threshold distance in the embedded vector space, and if no suitable nearest warm neighbor can be found, the cold generated item can be designated as freezing.

At 270, the nearest neighbor is identified as a suitable proxy (e.g., substitute) for the cold generated item. For example, matrix values for the nearest neighbor (e.g., warm) item can be copied into the matrix for the cold generated item or the matrix can be otherwise updated.

In practice, the method (e.g., 240-270) can be repeated for additional found cold items.

As described herein, the nearest neighbor search can incorporate a category of the cold generated item, categories can be used to filter results, fallback category filtering can be used, or the like. Alternatively, a nearest neighbor warm generated item can be filtered out based on categories associated with the cold generated item and the nearest neighbor warm generated item. The process can then find the next nearest neighbor and use it as a proxy (e.g., assuming it meets a threshold distance).

Subsequently, after the matrix has been updated, a generated item recommendation can be made based on copied values. For example, at 280, a recommendation can be output based on the generated-item-by-generated-item matrix.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, outputting a recommendation can be described as receiving a recommendation depending on perspective.

Example 4—Example Generated Items

In any of the examples herein, one or more recommendations can be made for a generated item; a generated item (or simply "item") can take the form of a product presented for sale in an online scenario (e.g., a retail portal). In practice, the recommendation can be for another generated item (e.g., product) also presented for sale.

Example 5—Example Recommendations

In any of the examples herein, a recommendation can be provided in response to a request for recommendation for a particular generated item for which recommendations are sought (or simply "request for a recommendation"). Such a recommendation can be provided in response to a request to a recommendation service. Input to the request can comprise an identifier for a particular generated item, and the output can be the recommendation, which can comprise one or more recommended generated items.

A basic concept for recommendations is that items that are frequently bought together are complementary. Thus, if one item is already bought, placed in a shopping basket, or being considered for purchase, a complementary item can be presented as a recommendation. Another way to describe recommendations is that a prediction is being made as to what might be the next item purchased. An accurate prediction typically finds a basis in past transactions (e.g., involving two complementary items).

In practice, the prediction may not be for a single item, but for a set of items (e.g., a ranked list that is ranked by a percentage probability or other value). Thus, a ranked list of recommendations can be provided instead of a single recommended item. For example, a generated item having a higher affinity can be ranked higher than one having lower affinity. Affinity can be determined based on the relative number of co-occurrences as indicated in a matrix. Distance in embedded vector space can also be used (e.g., a closer distance indicates greater affinity).

The components described herein can be incorporated into a recommendation extension service that extends a recommendation service that receives requests for recommendations (e.g., for an incoming generated item).

After the recommendation response is received from the recommendation service, the recommended generated item can be included in a user interface as a recommendation (e.g., in a form of a recommendation such as "you might also like [item]," "people who bought X, also bought [item]"). An image, hyperlink, or both can be included. Activation of the hyperlink navigates to a page showing further details on the item and a user interface for purchasing the item, adding it to an online shopping cart, or the like.

The recommendation can be communicated to another computer, which can store the recommended generated item in a data structure. For example, recommendations can be pre-computed in advance and stored to improve performance when responding to recommendation requests.

Example 6—Example Transactions

In any of the examples herein, a transaction can be an online shopping transaction (e.g., a customer buying generated items on an online portal). For example, generated items that are purchased together can be considered as being part of the same transaction. The generated-item-by-generated-item matrix can then represent observed occurrences when generated items are part of the same shopping session, purchased together (e.g., appear in the same online shopping basket), or the like.

Example 7—Example Sparse Data Scenarios

In any of the examples herein, recommendations in a sparse data scenario can be supported. For example, historical transaction data for a particular generated item may be below a threshold or missing entirely.

Cold generated items are those items that have very few or no transactions, which hampers making a reasonable recommendation. The technologies described herein can address such scenarios and continue to provide meaningful recommendations. For example, a newly added item with just a few transactions can still be part of a recommendation. As described herein, a generated item having fewer than a threshold number of co-occurrence transactions can be designated as cold. So, generated items in the matrix can be identified as cold based on a cold threshold. Such a threshold can be set depending on the size of the dataset and the average number of transactions for items.

A generated item can be designated as freezing in a number of ways. Generally, a scenario can arise in which it is difficult or impossible to generate a meaningful matrix, thus the entire scenario can be designated as a freezing start. Or, a generated item having fewer than a threshold number of co-occurrence transactions can be designated as freezing. If cold processing is performed, a cold generated item that has no nearest warm neighbor (e.g., within a threshold) found during cold processing can be designated as freezing.

As described herein, a generated item can be designated as warm in a number of ways. For example, if an item appears in a threshold number of co-occurrence transactions, it can be deemed warm.

In practice, a cold start scenario can emerge when there is generally enough transactional data, but there are products in the catalog that lack history, either because they simply do not sell well or are new additions to the category. As described herein, the warm items can be used to create a co-occurrence matrix and find a closest warm item for a given cold item. If it is sufficiently close, then matrix information for the warm item can be copied to that for the cold item.

In practice, a freezing start scenario can arise when all or most of the items in the catalog are cold. For example, perhaps there is not sufficient historical transactional data to even create a useful matrix in the first place. As described herein, one can create a matrix using a large, external data set and use it as a bridge or reference matrix to connect items in the catalog. For a given item in catalog, one can find a closest warm item in the reference matrix and then use co-occurring warm items as indicated in the matrix as candidates for finding close other items in the catalog as described herein.

Example 8—Example Embedding

In any of the examples herein, a generated item can be embedded in an embedded vector space based on one or more attributes of the generated item. An embedding can be calculated as a set of numerical values that represent the position of a representation of the generated item in a high-dimensional vector space. Thus, an embedding comprises a numerical representation of text, images, or the like.

Text associated with the generated item (e.g., textual attributes of the generated item) such as the title, description, characteristics, color, size, or the like can be used to calculate embeddings. Such attributes are typically available in a database storing a representation of the item. In the case of text, a word can be represented numerically based on the context of surrounding results.

To calculate a title embedding, the vector sum of each word in the title can be calculated, resulting in the embedding suitable for embedding a representation of the generated item into the embedded vector space.

Any number of techniques can be used to calculate the vector values for the embedding, including one-hot encoding and deep learning techniques such as applying a word-to-vector function (e.g., word2vec), Bidirectional Encoder Representations from Transformers (BERT), and the like. Deep learning embedding can capture context of a word (e.g., numerically representing a word within text based on surrounding words of the word).

A location of a generated item in the embedding vector space can be calculated without actually embedding the item. For example, vector values of text associated with the item can be calculated as described herein.

In practice, the embedding vector space can comprise a high-dimensional vector space (e.g., having at least 100 dimensions). In practice, a number of dimensions between 100 and 1,000 can be used.

Although separate embedding vector spaces are sometimes shown, such spaces can be the same space (e.g., the location for any given item is the same in both spaces). However, different indexes can be used for performance reasons (e.g., it is easier or more efficient to find a nearest neighbor).

The internal representation of the high-dimensional embedded vector space can take the form of the numerical representations of the items embedded therein. As described, an index can be used to speed performance.

Example 9—Example Product Substitution

In any of the examples herein, the process of finding a suitable warm generated item that can be used as a proxy for a cold generated item can be described as product substitution. As described herein, such product substitution can be based on nearest neighbor determinations in the embedded vector space.

An example of product substitution is a situation in which earrings of a particular type (e.g., sterling silver crystal hook earrings with Swarovski element) come in slightly different descriptions and various colors. If products are of the same material, and the only real substantive difference is color, it is typically possible to substitute a product of one color for the same basic product of a different color when making recommendations.

Example 10—Example Nearest Neighbor Search Technique

In any of the examples herein, a nearest neighbor search technique can be used to determine a nearest neighbor of a generated item represented in an embedded vector space. Distance can be calculated in a variety of ways, including Euclidean distance, cosine similarity, and the like.

In practice, to improve performance, an approximate nearest neighbor technique can be used to find an approximate nearest neighbor. Such an approach can avoid the curse of multi-dimensionality. For example, the ANNOY library ("Approximate Nearest Neighbors Oh Yeah") of Github can be used to find approximate nearest neighbors. Such an approach can be useful in scenarios involving 1,000 or more, 10,000 or more, 100,000 or more, 1,000,000 or more, or the like generated items.

In some cases, a nearest neighbor may not be very near. So, a threshold can be used to filter out those nearest neighbors that are not within a threshold distance of the generated item. For example, if no nearest warm neighbor is found for a cold neighbor, the cold technique can fail and designate the item as freezing. Or, in the case of an implementation using categories, those nearest neighbors having a category mismatch can be filtered out. Fallback category filtering can be used as described herein.

During development, a configurable threshold can be used so that adjustments can be made easily before freezing the threshold for production purposes.

Example 11—Example Implementation Details

In any of the examples herein, development can proceed by carefully choosing parameters and optimizing the process. Parameters for word2vec can be chosen. For example, a vector size of 512 worked well in one implementation. In one implementation, a window size (e.g., how many context words to capture in the forward and backward direction) of 8 worked well; a window size equal to the average size of titles worked well.

In practice, it is expected that other values may work well, depending on the domain.

Example 12—Example Category Incorporation into Nearest Neighbor Search

In any of the examples herein, categories can be incorporated into the nearest neighbor search technique.

The category can be included in the embedding. For example, a vector can be calculated for the category and added to the title.

Alternatively, a one-hot encoding can be created and concatenated to the title. Such an approach can be effective when the dataset is sparse.

Or, the output can be filtered based on category.

In practice, all three can be provided by a recommendation service, and the choice of which ones to use can be configured when employing the service.

Example 13—Example Filtering Via Category During or After Nearest Neighbor Search In any of the examples herein, output can be filtered based on category (e.g., product category). In such a case, remaining items (e.g., items surviving the filter) in a list can be used, or the process can be performed again to find another recommendation that is not filtered out. For example, relying on title alone can cause problems because generated items of vastly different categories (e.g., a real item versus a toy item) can be recommended based on title alone. The category labels of generated items can be used to filter out those generated items (e.g., in nearest neighbor search results) that are of a different category.

In any of the examples herein, fallback category filtering can be used. For example, categories can be represented in a hierarchical category tree. In fallback category filtering, results can be limited to those in the same category (e.g., category node) as the input item, and if no result is found in the same category, the process can navigate up one level in the category search and re-do the search (e.g., results in the same sub-branch of the category tree as the item are accepted). Such fallback filtering can be used, for example, to filter warm neighbors during or after nearest neighbor searching. Such fallback category filtering can be helpful to avoid the vastly different categories problem, while increasing the scope of available categories. Thus, greater chances of success in finding a matching item in the embedded space can be realized, and a recommendation can still be made.

In some cases, category labels in the category tree can be ambiguous (e.g., "Mens" label may appear in plural nodes of the tree). Thus, using a node identifier or other unique identifier instead of a textual description of the category can yield better results.

Figure 3:
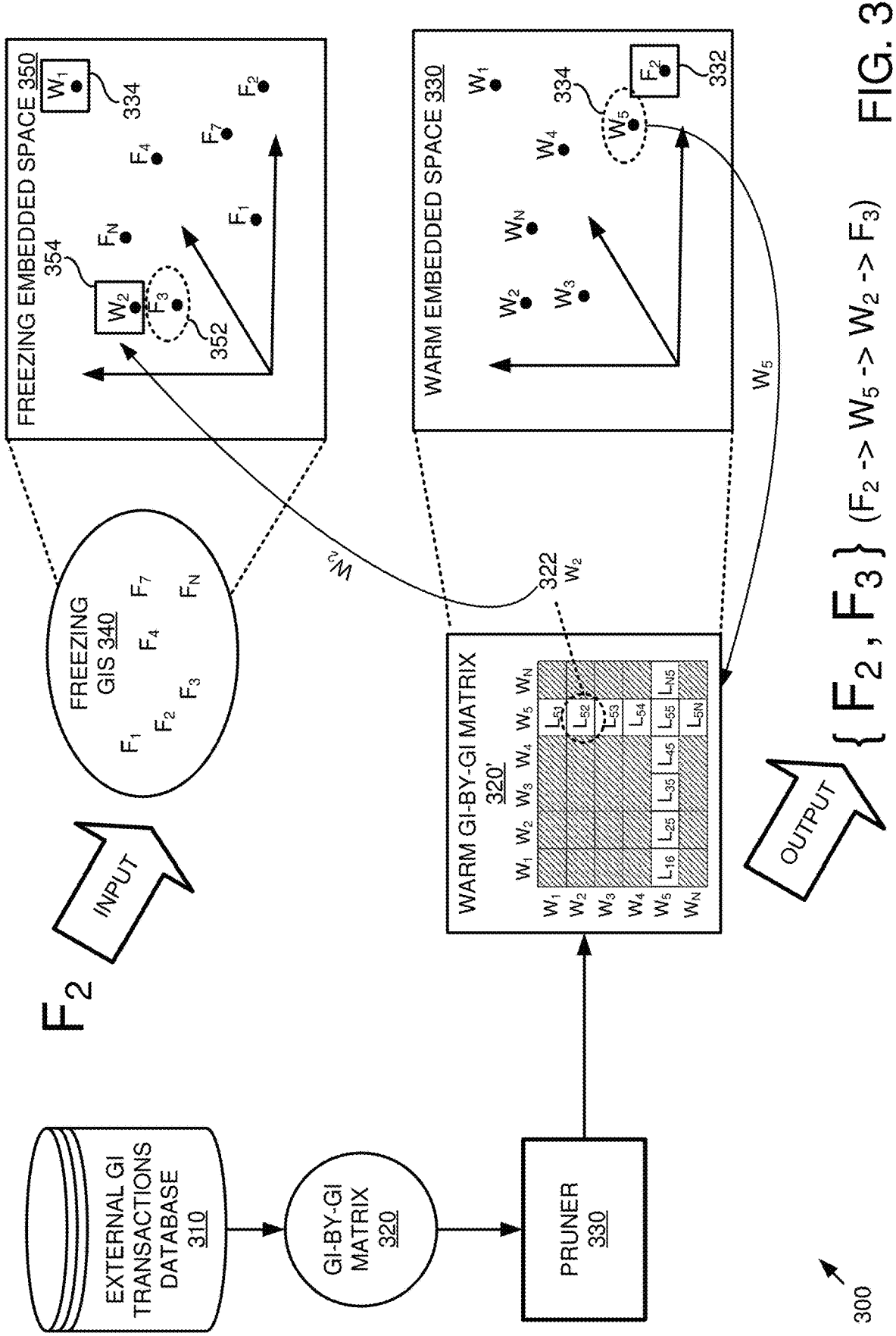
FIG. 3 is a block diagram of an example system implementing recommendations in a sparse data scenario with freezing generated items.

Example 14—Example System Implementing Recommendations in a Sparse Data Scenario with Freezing Generated Items FIG. 3 is a block diagram of an example system 300 implementing recommendations in a sparse data scenario with freezing generated items. Such a system 300 can comprise a matrix 320', an internal representation of a high-dimensional embedded vector space 330, 350, and a recommendation extension service (not shown) configured to associate freezing items as described herein.

In the example, an external database 310 stores historical data indicating when generated items were observed to be part of the same transaction (e.g., co-occurrence data).

A generated-item-by-generated-item matrix 320 taking the form of the matrix described herein can be generated from the database 310. A pruner 330 can navigate through the generated items represented in the matrix 320 and remove any items under a threshold number of transactions, resulting in a warm generated-item-by-generated-item matrix 320' that is used as part of freezing start processing.

The warm embedded space 330 stores representations of the warm generated items of the matrix 320'. Similarly, the freezing embedded space 350 stores representations of the freezing generated items 340. In practice, the two embedded vector spaces 330 and 350 can be the same vector space; however, they can be represented by different indexes (e.g., finding a nearest neighbor in one space comprises searching a first index and finding a nearest neighbor in the other comprises searching a second, different index). Items can be represented in the space based on embeddings as described herein. For example, textual descriptions of the items can be used to calculate such embeddings.

Processing can iterate over the freezing generated items 340. In the example, a given input freezing generated item $F_2$ is being processed. The location 332 of the freezing generated item in the warm embedded vector space 330 can be used to find a nearest neighbor external generated item $W_5$ 334. For purposes of discussion, the nearest neighbor is sometimes called "r" herein. A complementary threshold distance can be used so that only warm items within the complementary threshold distance qualify as nearest neighbors for further processing.

The nearest neighbor external generated item $W_5$ has matrix entries (in the row and column for $W_5$) in matrix 320' that contain references to external generated items that are treated as possible linking external generated items. For example, for non-zero matrix entries, the entries can be considered seriatim, in descending order, or the like. A high value in the matrix indicates correlation between the nearest warm neighbor and a linking item.

In the example, a value in $L_{51}$ indicates a correlation between $W_5$ and $W_1$, so $W_1$ is treated as a possible linking external generated item. However, when the location 334 of $W_1$ in the freezing embedded vector space 350 is determined, it can be observed that there is no nearest neighbor within a threshold distance. Accordingly, $W_1$ fails as a linking external generated item.

Further in the example, a value in $L_{52}$ indicates a correlation between $W_5$ and $W_2$, so $W_2$ is treated as a possible linking external generated item. And, indeed, a linked freezing nearest neighbor generated item F3 352 does exist within a threshold. Therefore, an association between the freezing generated item $F_2$ and the linked freezing generated item F3 can be output for use during recommendations. As described herein, such an association can be used to provide a recommendation for $F_2$, or to provide $F_2$ as a recommendation.

As shown, the warm matrix is used as a bridge in that $F_2$ is associated with external $W_5$, which is associated with external $W_2$, which is ultimately associated with $F_3$.

An internal representation of a category tree can also be used to filter linked items that exhibit a category mismatch between the linking item and the linked item as described herein. Those items surviving the filter can be used in recommendations. Fallback category filtering can be used as described herein.

In practice, further linked freezing generated items can be discovered, and such an approach can result in a ranked list of recommendations.

The described components can be part of a recommendation extension service that extends a recommendation service (not shown); such an extension service can perform the actions shown in the methods described herein. The recommendation service itself can be configured to receive a request for a generated item recommendation for an input generated item (e.g., a freezing generated item), wherein the recommendation service provides a recommendation comprising the linked freezing generated item based on the association described above. In practice, the recommendation service receives the item, looks it up in the matrix, and returns a result based on matrix entries that associate the item with other items in the matrix (e.g., an item with greatest affinity or a ranked list of i items with greatest affinity). Conversely, when a request for a recommendation for the linked freezing generated item is received, the freezing generated item can be provided as part of the recommendation.

Figure 4:
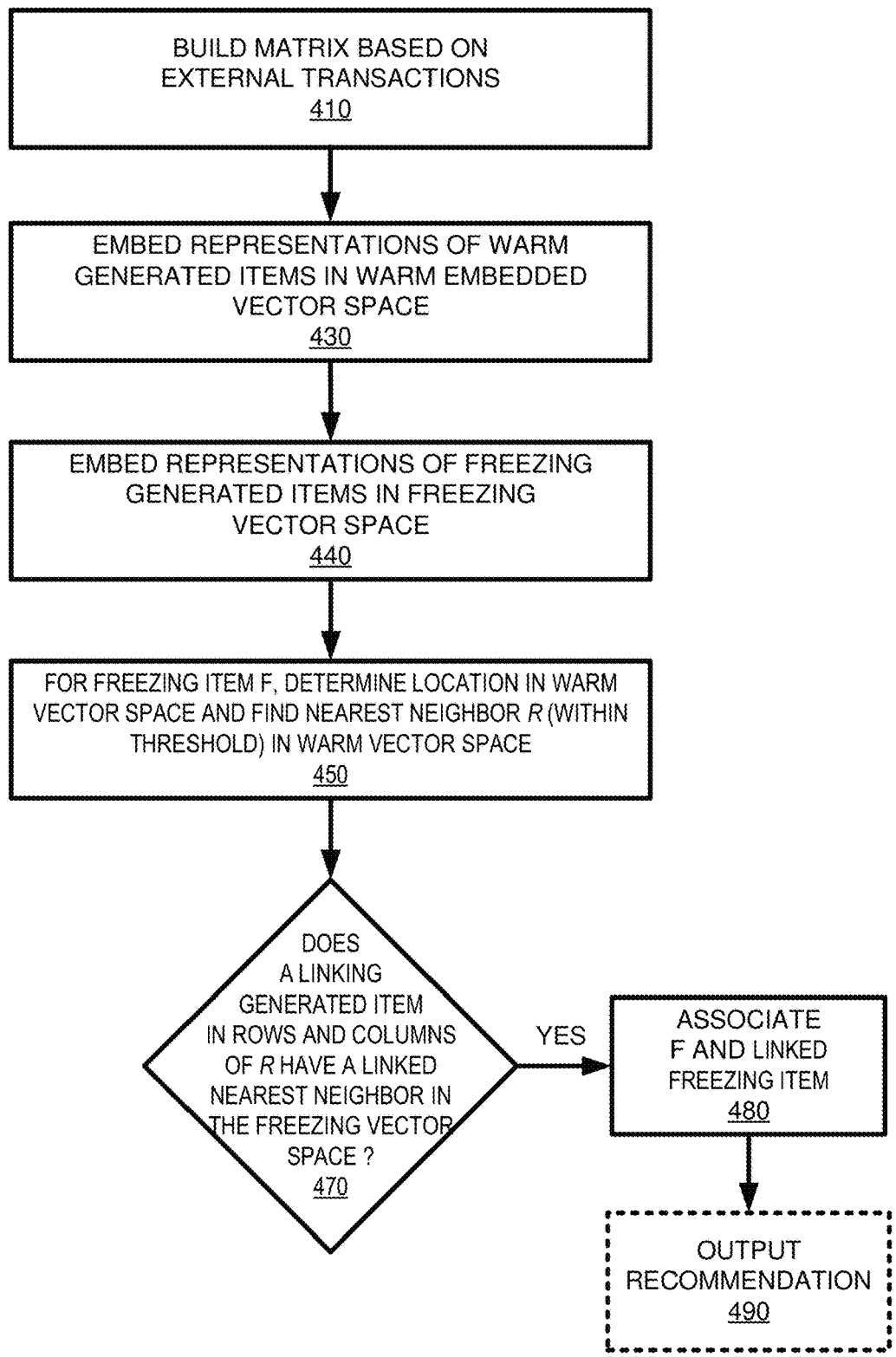
FIG. 4 is a flowchart of an example method of providing recommendations in a sparse data scenario with freezing generated items.

Example 15—Example Method of Providing Recommendations in a Sparse Data Scenario with Freezing Generated Items FIG. 4 is a flowchart of an example method 400 of providing recommendations in a sparse data scenario with freezing generated items and can be implemented, for example, by the system of FIG. 3. In practice, the method 400 can be performed subsequent to the method of 200, using generated items identified as freezing.

At 410, a generated-item-by-generated-item matrix is built that represents correlations between external generated items based on observed transactions for the generated items. As described herein, the matrix can be built based on an external database.

The matrix can be pruned. For example, any non-warm generated items can be pruned from the matrix using a threshold number of transactions. Items having fewer than the threshold can be removed from the matrix. The pruned matrix then represents only warm generated items.

The matrix can be normalized. For example, normalization can proceed based on an observed number of transactions per represented generated item in the matrix. As described herein, a number of observed co-occurrence transactions for a generated item can be represented in a diagonal of the matrix.

At 430, representations of the warm external generated items can be embedded in the warm embedded vector space using attributes of the items as described herein.

At 440, representations of the freezing generated items are embedded in the freezing embedded vector space using attributes of the items.

In practice, the two embedded vector spaces can be the same vector space; however, they can be represented by different indexes (e.g., finding a nearest neighbor in one space comprises searching a first index and finding a nearest neighbor in the other comprises searching a second, different index).

At 450 for a freezing item f, a location in the warm embedded vector space is determined and the nearest neighbor r to f is found in the warm embedded vector space. A complementary threshold distance can be used so that r is within the complementary threshold distance of f (e.g., it is not so far away as to not be suitable for complementary recommendation use). If a nearest neighbor r is found, the method continues.

At 470, for a given linking external generated item out of a plurality of possible linking external generated items appearing in the matrix for r, it can be determined whether a linked freezing nearest neighbor generated item exists for the given linking external generated item in the freezing embedded vector space. To achieve such a determination, the process can iterate through the items in the matrix for r: for a given candidate linking external generated item, the process can find whether a linked freezing nearest neighbor exists for the candidate within a threshold distance. If so, the linked freezing nearest neighbor can be added to a list with an indication of the level of co-occurrence, distance, or both. Then, the best linked freezing nearest neighbor can be used (e.g., based on the level of co-occurrence, distance, or both). Another way to describe the process is that for generated items appearing in the row and column of the matrix for r, check whether a nearest neighbor within a threshold in the freezing embedded vector space exists.

At 480, responsive to determining that a linked freezing nearest neighbor generated item exists, the freezing generated item is associated with the linked freezing nearest neighbor generated item for recommendation.

The process can be repeated to find additional linked freezing nearest neighbor generated items that can be used in a ranked list of recommended generated items. For example, at least one additional linking generated item out of the plurality of possible linking generated items can be found, and the at least one additional linked freezing nearest neighbor item can be associated with the freezing generated item.

Subsequently, a recommendation can be output based on the association (between the freezing generated item and the linked freezing nearest neighbor) at 490. For example, a request for a recommendation for the freezing generated item can be received. Responsive to such request, and based on the association described above, the system can respond with a recommendation comprising the linked freezing nearest neighbor generated item.

Example 16—Example Transactions Database

In any of the examples herein, a transactions database can take the form of a database storing transaction data for generated items. Co-occurrence data stored in the database can be mined to determine the number of transactions involving a co-occurrence between two generated items.

As described herein, external databases can be used in freezing start scenarios. Such databases include transaction data on items external to the generated items provided by the portal for which recommendations are made (e.g., external to an offered category of items). Thus, the external database can serve as a bridge database that provides a link between two freezing generated items, thus supporting recommendations for freezing generated items by leveraging historical transaction data in the external database.

Such an external database can take the form of an open database (e.g., available online to the public), or a proprietary database (e.g., purchased or licensed from an entity having access to such data that is helpful in supporting recommendations), or the like. The database can be a third-party database from a different entity than the entity providing the recommendation. As described herein, such databases store data indicating when generated items were observed to be part of the same transaction (e.g., co-occurrence data).

Example 17—Example Combination of the Cold and Freezing Technologies

The cold start and freezing start technologies can be combined. For example, in a cold scenario (e.g., as shown in FIGS. 1 and 2), one or more of the generated items may be deemed freezing (e.g., due to a failure of the cold start to find a suitable proxy for the freezing item). The freezing start can then be employed for such freezing items. Or, a threshold can be used to differentiate cold items from freezing items (e.g., items with zero or less than a threshold number of transactions are deemed freezing).

In a combination, the same embedding vector space can be used. As described herein, it can be useful to have separate indexes into the vector space for performance reasons.

Example 18—Example Matrix Processing

In any of the examples herein, a generated-item-by-generated-item matrix can be used to represent co-occurrences of items within transactions. As shown in the examples, a value in the matrix indicates co-occurrences between the two items represented in the entry (e.g., a value in the matrix represents the co-occurrence observations between the item of the particular row and the item of the particular column). In practice, the matrix represents how many times items showed up together in the same transaction (e.g., shopping basket, cart, or order).

In any of the examples herein, the matrix can be normalized. For example, normalization can proceed based on an observed number of transactions per represented generated item in the matrix. As described herein, a number of observed co-occurrence transactions for a generated item can be represented in a diagonal of the matrix. Alternatively, normalization can proceed row-by-row, column-by-column, or by rows and columns. For example, if values in a row add up to a value sum, entries in a row can be divided by sum, resulting in normalization of entries in the row. Thus, entries in a row can be normalized by dividing entries in the row by the sum of the values for entries in the row.

As described, the generated-item-by-generated item matrix can be of the size n×n, where n is the number of generated items. However, in practice, optimizations can be done to conserve space (e.g., if the matrix is symmetrical, a co-occurrence value need only be stored once).

Figure 5:
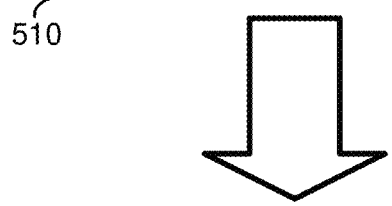
FIG. 5 is a block diagram of a generated-item-by-generated-item matrix M and a normalized version of M.
Figure 5:

FIG. 5 is a block diagram of a generated-item-by-generated-item matrix M 510 and a normalized version of M, M' 520. The example matrix M 510 shows a dataset comprising eight generated items (P1, P2, . . . , P8). The numbers in the table represent the number of times the item pair represented in the corresponding row and column were in the same transaction. The diagonal values show the total co-occurrence transactions for an item. The numbers in the matrix cells can be normalized by the diagonal values, which accounts for products that just may be commonly purchased. Pruning can remove cold items (e.g., those having below a threshold number of transactions in the matrix).

The normalized version of M, M' 520 shows a preprocessed matrix with cold items (P3, P5, P8) removed and co-occurrence values normalized. In the example, normalization is performed on a row-by-row basis, but in practice, other techniques can be used (e.g., divide entries in rows and columns of a diagonal by the value in the diagonal).

At this point, the embeddings can be calculated for the items, and the items separated into cold start and warm start products. Recommendations for warm items can proceed straightforward, based on values in the matrix (e.g., a higher value in a row y or column y for Px means that Py is complementary to Px and can be recommended). Higher values indicate a higher probability.

Figure 6:

FIGS. 6 and 7 are block diagrams of a substitution scenario for a matrix M; in the substitution scenario a warm item P2 serves as a proxy for a cold item P3.

For cold item P3, one finds the warm item most similar to P3 via the embeddings as described herein. In the example, P2 is the most similar (e.g., nearest neighbor), so recommendations for P2 are copied into the matrix for P3 as shown. Recommendations can now be made for P3, and P3 can be recommended.

If P5 is very similar to P1, and P8 is very similar to P6, the matrix shown in FIG. 7 will result.

The described technologies allow additional items in the catalog to have recommendations, which solves two challenges. First, they solve a recommendation problem for cold items (e.g., making a recommendation for cold item P5). Second, cold items can show up in recommendations. In the matrix of FIG. 7, for P4, the top 3 recommendations would be {P3, P2, P5}. P3 and P5 are both cold items that now show up in the recommendation.

Example 19—Example Software Architecture

Figure 8:
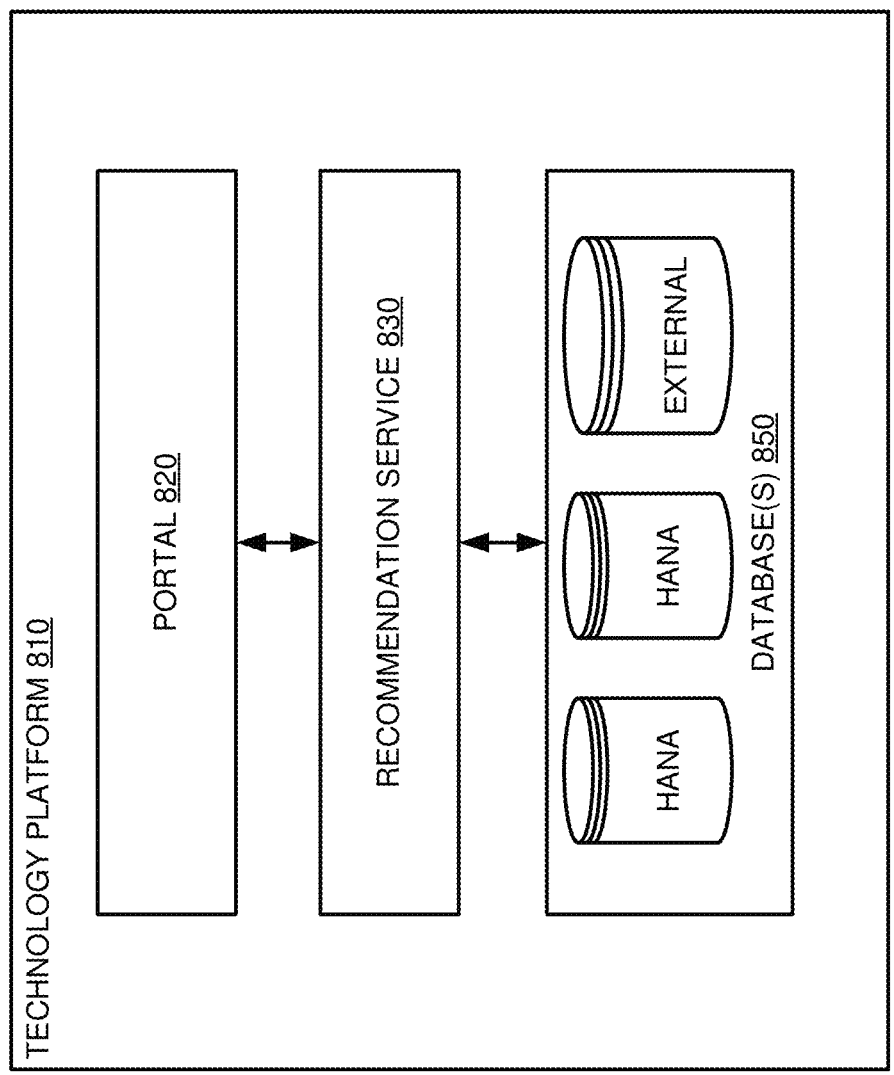
FIG. 8 is a block diagram of an example software architecture implementing recommendations in sparse data scenarios.

FIG. 8 is a block diagram of an example software architecture 800 implementing recommendations in sparse data scenarios that can be used to implement the technologies described herein.

In the example, a technology platform 810 supports a retail portal 820 that accesses a recommendation service 830, which provides recommendations based on databases 850, which can include an external database in freezing start scenarios. In practice, the external database contents can be imported to an internal database.

A recommendation extension service operating as part of the recommendation service 830 can take the form of the cold start technologies described herein, the freezing start technologies described herein, or both.

In any of the examples herein, the recommendation service 830 can be configured to receive a request for a generated item recommendation for an input generated item. The service 830 then provides a recommendation.

In a cold start scenario, the service 830 can consult a matrix supplemented with copied rows and columns as described herein (e.g., using values from suitable proxy items), and the recommendation can comprise an item as indicated by the matrix.

In a freezing start scenario, such a recommendation can comprise the linked freezing generated item based on an association between the freezing generated item and the linked freezing generated item as described herein.

Example 20—Example Pseudocode for Cold Method

The following is a pseudocode description of an implementation of a cold start method:
a. Build N×N product co-occurrence matrix M based on historical transaction data D. This is a symmetric square matrix.
b. Identify in M rows and columns where the diagonal value is less than threshold q (e.g., 5) (i.e., the product shows up in less than θ transactions). Store row/column ID of M in set C of "cold products." All other products (i.e., the "warm products") are stored in set W.
c. For all warm products p in W,
  i. Represent p in $\mathscr{R}^n$ vector space (where n is a number of dimensions and not necessarily related to the number of products). This can be achieved by embedding the title, description, category and image of p (or any combination thereof) in such space.
  ii. Add the embedding to an approximate nearest neighbor search index
d. For all cold products q in C,
  i. Embed q in the same in $\mathscr{R}^n$ vector space.
  ii. Identify the nearest neighbor of q in W. Call the nearest neighbor r and its similarity score with q "s," which can be calculated as cosine similarity, Euclidean distance, or any such measure.
  iii. If s passes a set threshold,
    1. deem r a suitable substitute for q, and copy the values in the row and column of r in M to the row and column corresponding to q.
  iv. Else
    1. deem r a "freezing product" and add it to set F.

Example 21—Example Pseudocode for Freezing Method

The following is a pseudocode description of an implementation of a freezing start method:
a. Take a separate (third party) data set of product transactions and build a square matrix M' of product co-occurrences similar to that in 1a above.
b. Prune rows and columns of M' if the diagonal value is less than threshold θ.
c. Normalize the rows and columns by the diagonal value.
d. For all products p in M',
  i. Embed p in the $\mathscr{R}^n$ vector space.
  ii. Add the embedding of p to a nearest neighbor search index I.
e. For all products p in the original transaction data D,
  i. Embed f in the same $\mathscr{R}^n$ vector space.
  ii. Add the embedding of f to a nearest neighbor search index J.
f. For all freezing products f in F,
  i. Embed f in the same $\mathscr{R}^n$ vector space.
  ii. Identify the nearest neighbor of f that passes a threshold in index I.
  iii. If a nearest neighbor r exists,
    1. For all p' in the row and column corresponding to r with a non-zero value,
      a. Identify the nearest neighbor of r in J that passes a threshold.
      b. If a nearest neighbor exists, add r to possible recommendations for f and add f as a possible recommendation for r.

Thus, for a set F of freezing items (e.g., items with little to no transactional data), a matrix M' of reference item cooccurrences from a different source can be used (e.g., if the freezing items are part of a catalog of products, the different source can show transactions for items that do not appear in the catalog).

For each freezing item in F, the most similar product in M' is identified via embeddings. The similar product is filtered to pass a similarity threshold. The comparison can be based on embeddings incorporating item name, description, image, category information, or the like. The most similar product r is then used in subsequent processing.

Based on M', we know that a) we can make complementary recommendations for r and b) we can also make r a complementary recommendation for other items in M'. In the case of a, one can take the recommendations for r in M' and find their most similar products back in the catalog. If such similar products exist, they can be added to the recommendation matrix as recommendations for r.

In the case of b, one can take the items that r is a recommendation for and repeat the nearest neighbor search. If a nearest neighbor exists, one can add them as possible items that r can be recommended with to the recommendation matrix.

Example 22—Example Further Description of Embedding

An AI-based framework can be used. Complementary items can be found by finding similar items (e.g., using the embedding techniques described herein) that can then be used in the cold or freezing scenarios. It can be challenging to find a similar product because the item metadata is converted to an embedding vector such that similar items are close to each other in the vector space. Then, one can compare similarity among items and choose a most or more similar item.

An advanced natural processing (NLP) algorithm can be used to compute the embedding vector of the item titles. However, it can be extended to other item information such as description, categories, image, etc. SentenceTransformers is a Python framework for useful text and image embeddings. The base layer of the framework comprises a pre-trained BERT model to map each word in a text to the embedding. In order to create a fixed-size title embedding, the model can apply mean pooling (e.g., the output embeddings for token are averaged to yield a fixed-sized vector). The text embeddings are passed to a Siamese neural network to derive semantically meaningful title embeddings that can be compared using cosine similarity.

In the case of a freezing start, open-source retail transactions or any similar purchase history can be used to offset a lack of data. One can associate the similarity of the open-source items to a given item in the catalog (e.g., the items that one would like to recommend complementary products for).

Example 23—Example Further Description of Nearest Neighbor Search

In any of the examples herein, a vector similarity search can be used to find similar items. It can be computationally expensive or impractical to calculate cosine similarity between 10,000 or 100,000 items. Given 1,000 products in the transactional data and 2,000 in a backlog, one would need to repeat the vector similarity calculation 1,000×2,000 times. An approximate nearest neighbor search technique can make the similarity search much faster.

There are three categories of approximate embedding similarity: tree-based like Approximate Nearest Neighbors Oh Yeah (ANNOY), hash-based like Facebook AI Search (FAISS), and graph-based like Hierarchical Navigable Small World (HNSW). Although different approaches can be used, one implementation used HNSW for speed and accuracy compared to other approaches. An HNSW index comprises navigable small world graphs in a hierarchy. A document in the index is represented by a single graph node. A node has an array of levels, from level 0 to n. The number of levels is constant during the lifetime of the node and is drawn randomly when the node is created. Nodes have at least level 0. In a level, there is a link array, which contains the document IDs of the nodes it is connected to at the level. The document IDs are used to lookup the actual tensor data points from memory.

In a freezing scenario, one can find complementary products for the transactional data set. One can match the complementary products for the list of open-source items using the technique similar to that in the cold start technique. One can then find a complementary item for the target item of the (freezing) catalog. After searching for the most similar item (item A) to the target item, one can detect the complementary product (item b) for product A using the technique similar to that in the cold start technique. Then, the same technique can be used to find the most similar item to item B from the item of the catalog, which will be an approximate complementary item to the item of the catalog. In other words, for a freezing item, a similar item A is found, then a complementary item (or linking item) B for A is found, then a similar item (a linked freezing item) to B is found, thus linking the freezing item to the linked freezing item. The freezing item can then be associated with the linked freezing item (e.g., in the matrix), and recommendations for the freezing item can be made (e.g., the linked freezing item can be recommended) and vice versa (e.g., the freezing item can be recommended in response to a request for recommendation for the linked freezing item).

Example 24—Example Implementations

Any of the following can be implemented.
Clause 1. A computer-implemented method comprising:
building a generated-item-by-generated-item matrix representing correlations between external generated items based on observed transactions for the external generated items;
embedding representations of the external generated items into a warm embedded vector space;
for a plurality of freezing generated items, embedding representations of the plurality of freezing embedded items into a freezing embedded vector space;
for a freezing generated item out of the freezing generated items, determining a location of the freezing generated item in the warm embedded vector space;
finding a nearest neighbor external generated item r of the freezing generated item within a complementary threshold distance of the freezing generated item in the warm embedded vector space;
for a given linking external generated item out of a plurality of possible linking external generated items appearing in the matrix for r, determining whether a linked freezing nearest neighbor generated item exists for the given linking external generated item in the freezing embedded vector space;
responsive to determining that a linked freezing nearest neighbor generated item exists, associating the freezing generated item with the linked freezing nearest neighbor generated item for recommendation; and
outputting a recommendation based on the association.
Clause 2. The method of Clause 1, further comprising:
receiving a request for a recommendation for the freezing generated item; and
responsive to the request for the recommendation and based on association between the freezing generated item and the linked freezing nearest neighbor generated item, responding with the recommendation, wherein the recommendation comprises the linked freezing nearest neighbor generated item.
Clause 3. The method of any one of Clauses 1-2, further comprising:
filtering the linked freezing nearest neighbor item with a category tree.
Clause 4. The method of any one of Clauses 1-3, further comprising:
finding at least one additional linking generated item out of the plurality of possible linking external generated items; and
associating at least one additional linked freezing nearest neighbor item with the freezing generated item.
Clause 5. The method of any one of Clauses 1-4 wherein:
the freezing embedded vector space and the warm embedded vector space are a same vector space.
Clause 6. The method of Clause 5 wherein:
the freezing embedded vector space and the warm embedded vector space are represented by different indexes;

finding a nearest neighbor in the warm embedded vector space comprises searching a first index; and determining whether a linked freezing nearest neighbor exists comprises searching a second index different from the first index.

Clause 7. The method of any one of Clauses 1-6 wherein:

determining whether a linked freezing nearest neighbor generated item exists incorporates a threshold.

Clause 8. The method of any one of Clauses 1-7 wherein:

determining whether a linked freezing nearest neighbor generated item exists comprises searching for an approximate nearest neighbor.

Clause 9. The method of any one of Clauses 1-8, further comprising:

pruning the generated-item-by-generated-item matrix; wherein:

the pruning comprises removing any non-warm generated items from the generated-item-by-generated-item matrix; and the pruned matrix represents warm generated items.

Clause 10. The method of any one of Clauses 1-9, further comprising:

normalizing the generated-item-by-generated-item matrix based on observed transactions per represented generated item.

Clause 11. The method of any one of Clauses 1-10, further comprising:

representing a number of observed co-occurrence transactions for a generated item in a diagonal of the generated-item-by-generated-item matrix.

Clause 12. The method of any one of Clauses 1-11, wherein:

embedding representations of the external generated items into the warm embedded vector space comprises:

for a given item out of the external generated items, calculating vector values of text describing the given item.

Clause 13. The method of Clause 12, wherein:

the text describing the given item comprises a title of the given item.

Clause 14. The method of any one of Clauses 12-13, wherein:

calculating vector values of text describing the given item comprises incorporating context of words in the text.

Clause 15. A system comprising:

a generated-item-by-generated-item matrix stored in one or more non-transitory computer-readable media and representing observed co-occurrences within transactions of external generated items represented in the matrix;

an internal representation of a high-dimensional embedded vector space in which a freezing generated item is represented along with a plurality of warm generated items out of the external generated items; and a recommendation extension service configured to identify a warm approximate nearest neighbor of the freezing generated item in the high-dimensional embedded vector space, search candidate linking items found in matrix entries of the warm approximate nearest neighbor for linked freezing items within a threshold distance of the candidate linking items in the high-dimensional embedded vector space, and responsive to finding a linked freezing generated item, associating the freezing generated item with the linked freezing generated item.

Clause 16. The system of Clause 15 further comprising:

a recommendation service configured to receive a request for a generated item recommendation for an input generated item, wherein the recommendation service provides a recommendation comprising the linked freezing generated item based on an association between the freezing generated item and the linked freezing generated item.

Clause 17. The system of any one of Clauses 15-16 wherein:

the external generated items are represented in the high-dimensional vector space based on respective textual descriptions of the external generated items.

Clause 18. The system of any one of Clauses 15-17 further comprising:

an internal representation of a hierarchical category tree;

wherein the linked freezing generated item is filtered with fallback category filtering.

Clause 19. The system of any one of Clauses 15-18 wherein:

the matrix is pruned to remove items having less than a threshold number of co-occurrences; and the matrix is normalized.

Clause 20. One or more non-transitory computer-readable media having stored therein computer-executable instructions that when executed by a computing system, cause the computing system to perform a method of outputting a generated item recommendation from a plurality of possible generated items, the method comprising:

building a generated-item-by-generated-item matrix representing correlations between external generated items based on observed transactions for the external generated items;

pruning the generated-item-by-generated-item matrix;

normalizing the generated-item-by-generated-item matrix;

embedding representations of the external generated items into a warm embedded high-dimensional vector space based on titles of the external generated items;

for a plurality of freezing generated items, embedding the plurality of freezing generated items into a freezing embedded high-dimensional vector space based on titles of the freezing generated items;

for a freezing generated item out of the freezing generated items, determining a location of the freezing generated item in the warm embedded high-dimensional vector space;

finding a nearest neighbor external generated item r of the freezing generated item within a complementary threshold distance of the freezing generated item in the warm embedded high-dimensional vector space;

for a given linking generated item out of a plurality of possible linking generated items appearing in rows and columns for r within the matrix, determining whether a linked freezing nearest neighbor generated item exists for the given linking generated item in the freezing embedded high-dimensional vector space; and responsive to determining that a linked freezing nearest neighbor generated item exists, associating the freezing generated item with the linked freezing nearest neighbor generated item for recommendation.

Clause 21. One or more computer-readable media having encoded thereon computer-executable instructions that, when executed by a computing system, cause the computing system to perform the method of any one of Clauses 1-14.

Clause 22. A computing system comprising:
at least one hardware processor;
at least one memory coupled to the at least one hardware processor; and
one or more non-transitory computer-readable media having stored therein computer-executable instructions that, when executed by the computing system, cause the computing system to perform any one of the Clauses 1-14.

Example 25—Example Computing Systems

Figure 9:
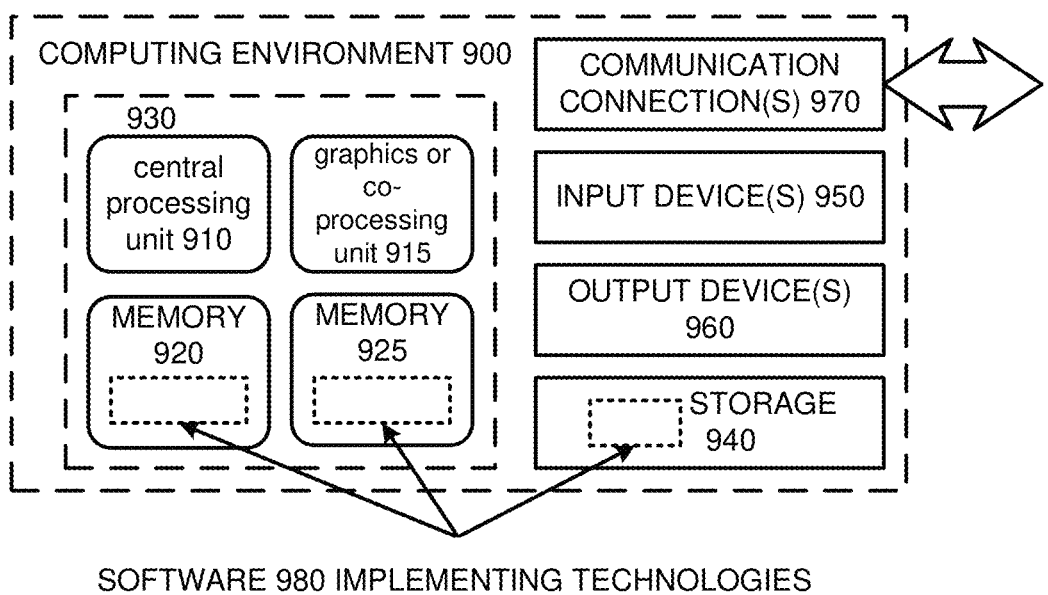
FIG. 9 is a block diagram of an example computing system in which described embodiments can be implemented.

FIG. 9 depicts an example of a suitable computing system 900 in which the described innovations can be implemented. The computing system 900 is not intended to suggest any limitation as to scope of use or functionality of the present disclosure, as the innovations can be implemented in diverse computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 can be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 can have additional features. For example, the computing system 900 includes storage 940, one or more input devices 950, one or more output devices 960, and one or more communication connections 970, including input devices, output devices, and communication connections for interacting with a user. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 can be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 can be an input device such as a keyboard, mouse, pen, or trackball, a voice input device, a scanning device, touch device (e.g., touchpad, display, or the like) or another device that provides input to the computing system 900. The output device(s) 960 can be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 26—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 27—Example Cloud Computing Environment

Figure 10:
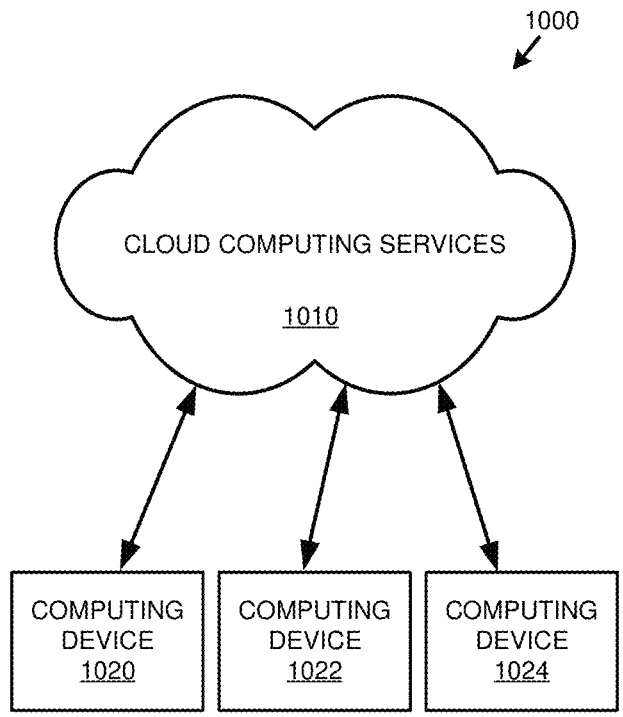
FIG. 10 is a block diagram of an example cloud computing environment that can be used in conjunction with the technologies described herein.

FIG. 10 depicts an example cloud computing environment 1000 in which the described technologies can be implemented, including, e.g., the system 100 of FIG. 1 and other systems herein. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

In practice, cloud-based, on-premises-based, or hybrid scenarios can be supported.

Example 28—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 29—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising: building, by at least one hardware processor of a recommendation system, a generated—
   item-by-generated-item matrix representing correlations between external generated items based on observed transactions for the external generated items from an external database;
   pruning, by the at least one hardware processor and a pruner, the generated-item-by-generated-item matrix;
   embedding, by the at least one hardware processor, the external generated items into a high-dimensional warm embedded vector space;
   for a plurality of freezing generated items, embedding, by the at least one hardware processor, the plurality of freezing generated items into a high-dimensional freezing embedded vector space;
   for a freezing generated item out of the plurality of freezing generated items, determining, by the at least one hardware processor, a location of the freezing generated item in the high-dimensional warm embedded vector space;
   finding, by the at least one hardware processor, a nearest neighbor external generated item r of the freezing generated item within a complementary threshold distance of the freezing generated item in the high-dimensional warm embedded vector space, comprising: calculating distances between the location of the freezing generated item and positions of the external generated items in the high-dimensional warm embedded vector space;
   for a given linking external generated item out of a plurality of possible linking external generated items appearing in the matrix for r, determining, by the at least one hardware processor, whether a linked freezing nearest neighbor generated item exists for the given linking external generated item in the high-dimensional freezing embedded vector space, comprising: calculating distances between a location of the given linking external generated item and other freezing generated items in the high-dimensional freezing embedded vector space;
   responsive to determining that a linked freezing nearest neighbor generated item exists, associating, by the at least one hardware processor, the freezing generated item with the linked freezing nearest neighbor generated item using the generated-item-by-generated-item matrix as a bridge to enable the association; and
   outputting, to an online portal, a recommendation based on the association.

2. The method of claim 1, further comprising:
receiving, from the online portal, a request for a recommendation for the freezing generated item; and
responsive to the request for the recommendation and based on association between the freezing generated item and the linked freezing nearest neighbor generated item, responding with the recommendation, wherein the recommendation comprises the linked freezing nearest neighbor generated item.

3. The method of claim 1, further comprising:
filtering, by the at least one hardware processor, the linked freezing nearest neighbor item with a category tree.

4. The method of claim 1, further comprising:
finding, by the at least one hardware processor, at least one additional linking generated item out of the plurality of possible linking external generated items; and
associating, by the at least one hardware processor, at least one additional linked freezing nearest neighbor item with the freezing generated item.

5. The method of claim 1 wherein:
the high-dimensional freezing embedded vector space and the high-dimensional warm embedded vector space are a same vector space.

6. The method of claim 5 wherein:
the high-dimensional freezing embedded vector space and the high-dimensional warm embedded vector space are represented by different indexes;
finding a nearest neighbor in the high-dimensional warm embedded vector space comprises searching a first index; and
determining whether a linked freezing nearest neighbor exists comprises searching a second index different from the first index.

7. The method of claim 1 wherein:
determining whether a linked freezing nearest neighbor generated item exists incorporates a threshold.

8. The method of claim 1 wherein:
determining whether a linked freezing nearest neighbor generated item exists comprises searching for an approximate nearest neighbor.

9. The method of claim 1, further comprising:
wherein: the pruning comprises removing any non-warm generated items from the generated-item-by-generated-item matrix; and the pruned matrix represents warm generated items.

10. The method of claim 1, further comprising:
normalizing, by the at least one hardware processor, the generated-item-by-generated-item matrix based on observed transactions per represented generated item.

11. The method of claim 1, further comprising:
representing, by the at least one hardware processor, a number of observed co-occurrence transactions for a generated item in a diagonal of the generated-item-by-generated-item matrix.

12. The method of claim 1, wherein:
embedding the external generated items into the high-dimensional warm embedded vector space comprises:
for a given item out of the external generated items, calculating vector values of text describing the given item.

13. The method of claim 12, wherein:
the text describing the given item comprises a title of the given item.

14. The method of claim 12, wherein:
calculating vector values of text describing the given item comprises incorporating context of words in the text.

15. One or more non-transitory computer-readable media having stored therein computer-executable instructions that when executed by a computing system, cause the computing system to perform a method of outputting a generated item recommendation from a plurality of possible generated items, the method comprising:
building, by at least one hardware processor of a recommendation system, a generated-item-by-generated-item matrix representing correlations between external generated items based on observed transactions for the external generated items from an external database;
pruning, by the at least one hardware processor, the generated-item-by-generated-item matrix;
normalizing, by the at least one hardware processor, the generated-item-by-generated-item matrix;
embedding, by the at least one hardware processor, the external generated items into a high-dimensional warm embedded vector space based on titles of the external generated items;
for a plurality of freezing generated items, embedding, by the at least one hardware processor, the plurality of freezing generated items into a high-dimensional freezing embedded vector space based on titles of the freezing generated items;
for a freezing generated item out of the plurality of freezing generated items, determining, by the at least one hardware processor, a location of the freezing generated item in the high-dimensional warm embedded vector space;
finding, by the at least one hardware processor, a nearest neighbor external generated item r of the freezing generated item within a complementary threshold distance of the freezing generated item in the high-dimensional warm embedded vector space;
for a given linking external generated item out of a plurality of possible linking external generated items appearing in rows and columns for r within the matrix, determining, by the at least one hardware processor, whether a linked freezing nearest neighbor generated item exists for the given linking external generated item in the high-dimensional freezing embedded vector space;
responsive to determining that a linked freezing nearest neighbor generated item exists, associating, by the at least one hardware processor, the freezing generated item with the linked freezing nearest neighbor generated item using the generated-item-by-generated-item matrix as a bridge to enable the association; and
outputting, to an online portal, a recommendation based on the association.

* * * * *